United States Patent [19]

Tsumazawa

[11] 4,165,926
[45] Aug. 28, 1979

[54] TRIGGER DEVICE FOR SOUND MOTION PICTURE CAMERAS

[75] Inventor: Hiroyuki Tsumazawa, Sakai, Japan

[73] Assignee: Minolta Camera Kabushiki Kaisha, Osaka, Japan

[21] Appl. No.: 867,036

[22] Filed: Jan. 5, 1978

[30] Foreign Application Priority Data

Jan. 10, 1977 [JP] Japan ............................. 52/1869[U]

[51] Int. Cl.² .............................................. G03B 31/02
[52] U.S. Cl. ....................................... 352/27; 352/29; 352/174
[58] Field of Search ................. 352/27, 174, 176, 177, 352/29

[56] References Cited

U.S. PATENT DOCUMENTS

| 3,520,598 | 7/1970 | Murata et al. | 352/177 |
| 3,825,327 | 7/1974 | Kosarko et al. | 352/29 |
| 3,880,504 | 4/1975 | Marvin | 352/29 |
| 3,957,363 | 5/1976 | Hayashi et al. | 352/72 |
| 4,090,783 | 5/1978 | Mizuki | 352/27 |

FOREIGN PATENT DOCUMENTS 5173036 6/1976 Japan .

OTHER PUBLICATIONS

Japanese Magazine, "Kogata Eiga", 1975 Annual, pp. 16 and 17.
Japanese Magazine, "Kogata Eiga", pp. 29 and 30.

Primary Examiner—Monroe H. Hayes
Attorney, Agent, or Firm—Watson, Cole, Grindle & Watson

[57] ABSTRACT

A trigger device for a sound motion picture camera actuates a capstan drive mechanism of the camera at an initial stage of advancing movement of a reciprocatable trigger member and claw and shutter drive mechanism of the camera simultaneously with resilient contact of a pinch roller holder with a capstan at a final stage of the advancing movement of the trigger member. A locking member releasably locking a pinch roller holder at its retracted position wherein the pinch roller is separated from the capstan, is disposed in the path of the advancing movement of the trigger member at a position wherein it is disabled by the trigger member at the final stage of the advancing movement of the trigger member. A wire spring of relatively small spring constant is engaged with the pinch roller holder and a movable member, which is in turn engageable with the trigger member upon the advancing movement of the trigger member, such that the wire spring is loaded by way of the movable member in response to the advancing movement of the trigger member, for urging the pinch roller holder towards an advanced position wherein the pinch roller is in resilient contact with the capstan. A switch is disposed in the path of the movement of the pinch roller holder so as to be activated for actuating the claw and shutter drive mechanism of the camera when the pinch roller holder is moved to its advanced position after released from the locking member.

6 Claims, 6 Drawing Figures

TRIGGER DEVICE FOR SOUND MOTION PICTURE CAMERAS

BACKGROUND OF THE INVENTION

This invention relates to a trigger device for a sound motion picture camera.

As is well known, a film feeding device of a sound motion picture camera includes an intermittent feeding mechanism coupled with a shutter having a claw adapted to fit in one of perforations of a film in engaging relation thereto, for feeding the film intermittently; and a continuous feeding mechanism having a capstan and pinch roller which is adapted to resiliently-contact the capstan. Both film feeding mechanisms start running at a lag therebetween, so that the capstan may start rotating prior to the actuation of the claw and the shutter. This time lag originates from the arrangement of both mechanisms. In the intermittent film-feeding mechanism, a claw and shutter drive motor is large in torque and small in load, and the running of the claw and shutter drive motor at a given speed is accomplished immediately after the starting thereof, thus enabling the claw and shutter to actuate at a given speed immediately after the starting. On the contrary, in the continuous film-feeding mechanism, a mechanism for rotating the capstan, in general, consists of a fly wheel large in inertia and a belt, and a certain time is required from the starting of the capstan motor until the rotation of the capstan at a given speed is established. Taking this lag in operation between two mechanisms into account, the capstan motor is so arranged as to start at the initial stage of the release or trigger operation.

As a result, if the timing of bringing the pinch roller into resilient-contact with the capstan is earlier than the starting of the claw and shutter, it follows that a film which is paid out of a film cartridge and loosely wound in the form of loop is shifted by the capstan and pinch roller, independently of actuation of the claw and shutter, and the following problems would result.

(a) It is usual for a sound motion picture camera that, the instant the pinch roller is brought into pressure-contact with the capstan, a film engages a record head, and the recording of sound signals thereto is started. However, since the sound-recorded film is shifted before the claw and shutter start, there is experienced in the reproduction that the sound reproduced fails to correspond to an image projected to a screen.

(b) While the claw and shutter remain imoperative, dislocation of a film takes place in the exposure aperture portion, thus leading to production of a picture having image mismatching.

(c) The film is unnecessarily pulled into tension, thus causing the idling of the capstan and pinch roller, as a result of which the pinch roller made of rubber suffers deformation due to friction relative to the film, and it becomes difficult to take the film cartridge out of the camera body, after the termination of the photographing.

On the other hand, the fact that the timing of bringing the pinch roller into resilient-contact with the capstan is earlier than the timing of starting the claw and shutter results in that, at the interruption of the trigger operation, the film continues to be fed, with the claw and shutter maintained stopped. Also in this event, the same problems as the above-described result.

To solve the above problems, a trigger device having a tumbler spring has been proposed, in which, in the process of the trigger operation, the pinch roller is brought into resilient-contact with the capstan instantaneously under the action of the tumbler spring. With this trigger device, a strong force is required for the tumbler spring, leading to the trigger operation which requires an increased operating force.

SUMMARY OF THE INVENTION

It is, accordingly, an object of the present invention to provide a trigger device for a motion picture camera, which device requires a little force for a trigger operation as well as eliminates the shortcomings (a), (b) and (c) experienced in prior art trigger devices.

Another object of the present invention is to provide a trigger device of the above described type, which is simple in construction.

To accomplish these objects, a trigger device of the present invention includes first locking means for releasably locking a pinch roller holder wherein a pinch roller is separated from a capstan, first spring means for urging the pinch roller holder towards an advanced position wherein the pinch roller is in resilient contact with the capstan, and means for loading the first spring means in response to advancing movement of a reciprocatable trigger member. The first locking means is disposed in the path of the advancing movement of the trigger member at a position wherein it is disabled by the trigger member at a final stage of the advancing movement of the trigger member. The loading means is coupled with the pinch roller holder and capable of being coupled with the trigger member at least upon the advancing movement of the trigger member. Thus, the first spring means is loaded to urge the pinch roller holder towards its advanced position in response to the advancing movement of the trigger member. Upon the disablement of the first locking means, the pinch roller holder is allowed to be moved rapidly to its advanced position under the action of the first spring means which has been loaded. The trigger device of the present invention further includes a pair of actuating means for actuating conventional capstan drive means and claw and shutter drive means of a sound motion picture camera, respectively. One of the actuating means is adapted to actuate the capstan drive means at an initial stage of the advancing movement of the trigger member whereas the other of the actuating means is adapted to actuate the claw and shutter drive means immediately after the disablement of the first locking means.

With the above arrangement, the claw and shutter drive means starts actuation at the same time the pinch roller is brought into resilient contact with the capstan, which will be rotating at a stabilized speed since the capstan drive means has been actuated for a sufficient period of time. This eliminates the shortcomings (a), (b) and (c) experienced in prior art trigger devices at the time of trigger actuation.

Furthermore, the first spring means is kept loaded by the loading means even after the pinch roller is moved to its advanced position so long as the trigger member is not returned since it is coupled with the loading means. Thus, the first spring means need not be a tumbler spring but may be an ordinary wire spring of relatively small spring constant. This allows a trigger operation to be conducted with a little force though the operation accompanies the loading of the first spring means by way of the loading means.

In preferred embodiments according to the present invention, the loading means includes a movable member movable from an initial position to a terminal position in response to the advancing movement of the trigger member for loading the first spring means and capable of being coupled with the pinch roller holder at least upon its movement from its terminal position to its initial position. Second spring means and second locking means are provided, respectively for urging the movable member towards its initial position and for releasably locking the movable member at its terminal position against the action of the second spring means. Either the movable member or the second locking means is supported on the trigger member such that the locking is effected at the final stage of the advancing movement of the trigger member prior to the disablement of the first locking means and that the movable member is released from the second locking means when the trigger member is returned. Further, the claw and shutter drive actuating means includes a switch which is disposed in the path of the movement of the pinch roller holder so as to be activated for actuating the claw and shutter drive means when the pinch roller holder is moved to its advanced position.

In the preferred embodiments, the movable member, when released from the second locking means, is moved rapidly to its initial position under the action of the second spring means. Then, the pinch roller holder is also moved rapidly to its retracted position through the coupling with the movable member, and simultaneously therewith the switch is deactivated for interrupting the actuation of the claw and shutter drive means. This also eliminates the shortcomings (a), (b) and (c) experienced in prior art trigger devices at the time of interruption of a trigger.

The above and other objects and features of the present invention will become more apparent from the following description taken in connection with the accompanying drawings.

DESCRIPTION OF PREFERRED EMBODIMENTS

Prior to the description of the preferred embodiments of the present invention, the prior art trigger devices will be in detail referred to, in order to clarify the problems for solution more concretely.

Figure 1:
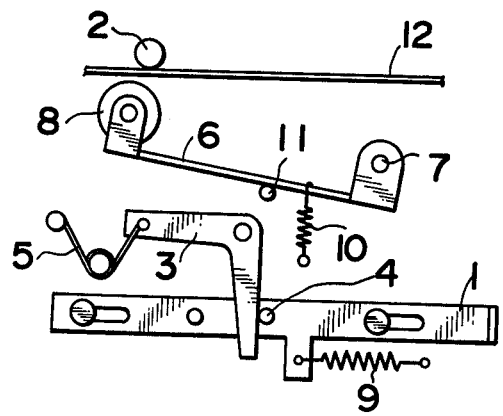
FIGS. 1 and 2 are side views of prior art trigger devices for a sound motion picture camera.

FIG. 1 shows an example of a prior art trigger device for a sound motion picture camera, which is free of the above itemized problems (a), (b) and (c). When a trigger plate 1 is shifted leftwards, a switch (not shown) closes to start a capstan motor, whereby a capstan 2 starts rotating. The leftward stroke of trigger plate 1 rotates a lever 3 clockwise by a pin 4, so that a tumbler spring 5 is loaded while being lifted upwards as viewed in the figure. A further leftward stroke of trigger member 1 disengages lever 3 from pin 4. As a result, lever 3 is abruptly rotated clockwise under the action of tumbler spring 5 to impinge on a pinch roller holder 6, thereby rotating the holder 6 clockwise about a shaft 7, whereby a pinch roller 8 is instantaneously brought into resilient contact with capstan 2. Simultaneously with the above movement, another switch (not shown) is turned on by trigger member 1, to thereby start a claw and shutter drive motor, thereby allowing the operation of a claw and shutter, as well as the recording of a film. On the returning stroke (rightward movement) of trigger member 1 under the action of a spring 9, pinch roller holder 6 urges lever 3 under the action of a spring 10, thereby rotating the lever counterclockwise, whereby pinch roller 8 instantaneously disengages from capstan 2 into its home position at which the movement of the roller is regulated by a pin 11. At this instant, the aforesaid switch is turned off, to thereby stop the claw and shutter drive motor, thereby interrupting operation of the claw and the shutter.

With the prior art trigger device shown in FIG. 1, by means of tumbler spring 5 and return spring 10, the pinch roller 8 in instantaneously brought into resilient contact with capstan 2 as well as instantaneously separated from the capstan, and simultaneously with the resilient contact and the separation, operation of the claw and the shutter is started and interrupted respectively. For a duration which the claw and the shutter remain inoperative, capstan 2 continues idling. Accordingly, this trigger device is free from the problems so far described, yet accompanied by another shortcoming that tumbler spring 5 must have a strong force. The reason is that, after disengagement of lever 3 from pin 4, no member other than this tumbler spring acts to maintain pinch roller 8 in pressure-contact with capstan 2. Should this tumbler spring be weak, the pressure acting on pinch roller 8 for engagement with capstan 2 would be weak, with the failure to feed film 12. Accordingly, a heavy force is unavoidably required for the trigger operation.

Figure 2:
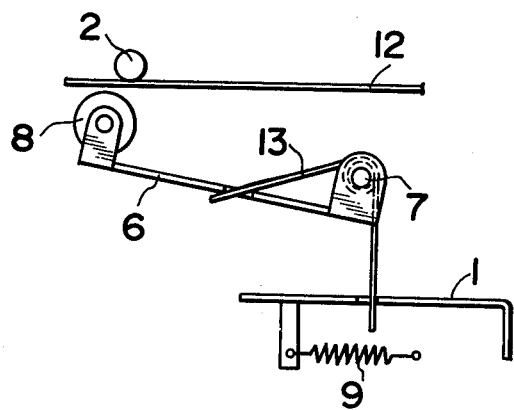

FIG. 2 shows another example of a prior art trigger device, wherein the trigger operation is conducted with a light force. If a trigger member 1 is shifted leftwards, a capstan 2 starts idling likewise in the device as shown in FIG. 1, while a spring 13 is loaded. As spring 13 ls loaded, a pinch roller holder 6 starts rotating clockwise under the biasing force of this spring, such that in the progress of the trigger operation, pinch roller 8 is brought into resilient contact with capstan 2, and a film is fed by capstan 2 and pinch roller 8 prior to the starting of the claw and the shutter. On the rightward stroke of trigger member 1 under the action of a spring 9, pinch roller 8 disengages from capstan 2 with the lapse of a certain period of time after interruption of the operation of the claw and the shutter. With this trigger device, since the trigger member continues to urge spring 13 during the leftward movement thereof, not so strong a force is required for this spring, thus requiring only a light force for trigger operation. Yet, because the film continues to be fed even for a duration which the claw and the shutter remain inoperative, the above-described problems (a), (b) and (c) are attended.

Figure 3:
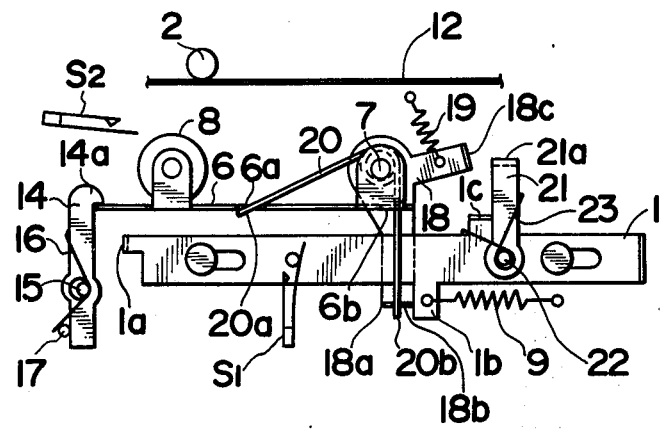
FIGS. 3 and 4 are side views of a trigger device for a sound motion picture camera according to a embodiment of the present invention, which device is shown in a condition prior to commencement of trigger actuation in FIG. 3 and in a condition after completion of trigger actuation in FIG. 4.
Figure 4:
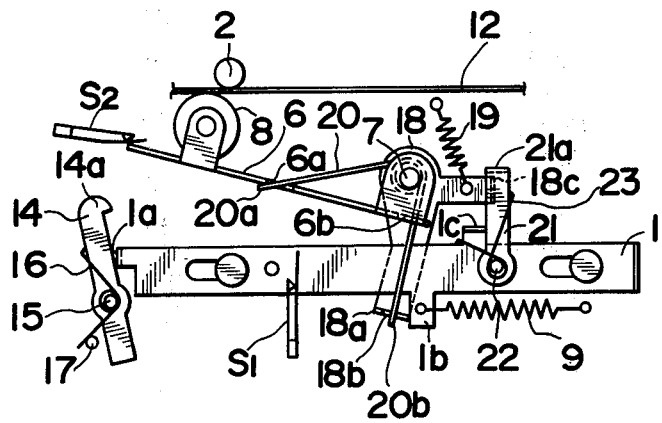

FIGS. 3 and 4 show a trigger device according to a first embodiment of the present invention, wherein FIG. 3 illustrates the condition of the trigger device prior to the trigger operation, and FIG. 4 illustrates the condition of the device after termination of the trigger operation.

A trigger plate 1 slidingly reciprocates likewise those of the prior art trigger devices as shown in FIGS. 1 and 2, and is so loaded as to move rightwards under the action of a spring 9. A pinch roller holder 6 is pivotally supported by a shaft 7, so as to assume a position shown in FIG. 4 in which a pinch roller 8 is brought into resilient-contact with a capstan 2 (hereinafter referred to as a resilient-contact position) and a position shown in FIG. 3 in which the roller disengages from capstan 2 into a locked or retracted position (hereinafter referred to as a retracted position). Shown at 14 is a first lock lever for locking pinch roller holder 6 in the retracted position, which is so loaded as to rotate about a shaft 15 clockwise under the action of a spring 16 and retains pinch roller holder 6 in the locked condition by the engagement of its lower arm portion with a pin 17. When trigger plate 1 is shifted leftwards to the extremity, lock lever 14 is urged by a left bent end 1a of trigger plate 1, thereby releasing pinch roller holder 6 from the locked condition.

Designated at 18 is an auxiliary lever for returning pinch roller holder 6 from the resilient contact position to the retracted position. Auxiliary lever 18 is mounted on shaft 7 and so loaded as to rotate counterclockwise from the terminal position shown in FIG. 4 to the home position shown in FIG. 3 under the action of a spring 19. This auxiliary lever has a lower bent end portion 18a maintained in engagement with a lower projection 1b of trigger plate 1. A spring 20 biases pinch roller holder 6 to the resilient contact position and is adapted to operatively interconnect auxiliary lever 18 and pinch roller holder 6 when the lever is rotated toward its home position. This spring is wound about shaft 7, and has one prong end 20a fitted in a cut-away portion 6a in pinch roller holder 6 in engagement with the circumferential wall thereof, and the other prong extending through hole 6b in pinch roller holder 6 to the lower bent end 18a of auxiliary lever 18, so that the lower end portion 20b of the other prong of spring 20 may be retained in engagement by one wall edge of a cut-away portion 18b provided in bent end portion 18a of auxiliary lever 18.

A second lock lever 21 is provided so as to lock auxiliary lever 18 in the terminal position. This second lock lever is so loaded as to rotate about a shaft 22 counterclockwise under the action of a spring 23, which shaft in turn is rigidly mounted on trigger plate 1. The second lock lever brings its bent arm end 21a into engagement with the lower bent end 18a of auxiliary lever 18 and its arm portion contacts an upper projection 1c of trigger plate 1, thereby locking auxiliary lever 18.

In this embodiment, when trigger plate 1 is shifted leftwards to some extent from the position shown in FIG. 3, a switch S1 is turned on, to thereby run a capstan motor M1, whereby capstan 2 starts rotating. A switch S2 for a claw and shutter drive motor M2 is disposed in the path of the rotation of pinch roller holder 6 so as to be turned on when pinch roller holder 6 is urged to the pinch roller engaging position and to be turned off when the holder is returned to the retracted position. In other words, operation of the claw and the shutter is started at the same time as pinch roller 8 is brought into resilient-contact with capstan 2, and interrupted concurrently with the disengagement of the pinch roller from the capstan. Although a sound recording circuit (not shown) is so arranged as to become operative at the time at which trigger plate 1 is shifted leftwards to some extent from the position shown in FIG. 3, since a film 12 remains out of contact with a record head (not shown) until pinch roller 8 comes to resilient contact with capstan 2, then the actual recording of sound signals to film 12 is not effected at this stage.

In operation, when trigger plate 1 is shifted leftwards from the position shown in FIG. 3 by the trigger operation, then capstan 2 starts rotating, and the sound recording circuit initiates its operation. In the process of the leftward stroke of trigger plate 1, lower bent end portion 18a of auxiliary lever 18 is urged by projection 1b of trigger plate 1, so that auxiliary lever 18 will be rotated clockwise against the force of spring 19, whereby spring 20 is gradually loaded. When trigger plate 1 is further shifted leftwards to its extremity, then first lock lever 14 is forced by left bent end portion 1a of trigger plate 1 to rotate counterclockwise, thereby releasing pinch roller holder 6 from the locked condition. Consequently, pinch roller holder 6 is abruptly rotated clockwise under the action of spring 20 thus loaded, thereby bringing pinch roller 8 into resilient contact with capstan 2 instantaneously, whereby the feeding of film 12 by pinch roller 8 and capstan 2 is allowed, and the film engages the record head. Thus, the recording of sound signals to the film is allowed. The clockwise movement of pinch roller holder 6 causes the claw and the shutter to actuate, whereby film 2 is intermittently fed and exposure to the film thus intermittently fed is achieved.

With the progress of the leftward stroke of trigger plate 1, second lock lever 21 is also shifted leftwards, and as soon as the top bent end portion 21a of the second lock lever engages bent end portin 18c of auxiliary lever 18 rotating clockwise, then second lock lever 21 is once rotated clockwise to some degree against the force of spring 23. Immediately before the engagement of trigger plate 1 with first lock lever 14, auxiliary lever 18 is further rotated clockwise to position its bent end portion 18c under top bent end portion 21a of second lock lever 21, whereas the second lock lever is again rotated counterclockwise under the action of spring 23 into a position at which the second lock lever engages upper projection 1c of trigger plate 1, with top bent end portion 21a of this lever engaging bent end portion 18c of auxiliary lever 18.

Thus, all the members are settled in the positions shown in FIG. 4. At this time, the other prong of spring 20 extending through the hole 6b in pinch roller holder 6 becomes out of contact with the peripheral wall of the hole, thus cutting off the operative connection between auxiliary lever 18 and pinch roller holder 6. Yet, the other prong of spring 20 is maintained urged at its lower end 20b by the right side wall edge of cut-away portion 18b of auxiliary lever 18.

When the trigger operation is interrupted, trigger plate 1 starts the returning stroke to the right under the action of spring 9, and hence second lock lever 21 is also shifted rightwards. As a result, top bent end portion 21a of second lock lever 21 disengages from bent end portion 18c of auxiliary lever 18, thereby allowing auxiliary lever 18 to rotate counterclockwise towards its home position under the action of spring 19. Then, spring 20 restores its original condition, by its own force, in which the other prong piercing through the hole 6b in pinch roller holder 6 engages the right side wall of the hole. Thereafter, the left side wall of cut-away portion 18b of auxiliary lever 18 becomes engaged with the lower end portion 20b of the other prong of spring 20, whereby the operative connection between auxiliary lever 18 and pinch roller holder 6 is accomplished by spring 20. Thus, pinch roller holder 6 is abruptly rotated counterclockwise toward the retracted position under the rotational force of auxiliary lever 18, whereby pinch roller 8 instantaneously disengages from capstan 2. Thus, the continuous feeding of film by pinch roller 8 and capstan 2 is interrupted, as well as claw and the shutter drive motor M2 is stopped, to interrupt the intermittent feeding of film as well as the exposure to the film. Film 12 diverts from the record head concurrently, followed by the interruption of the recording of sound signals to film 12. Immediately before trigger plate 1 resumes its home position shown in FIG. 3, the sound recording circuit stops its operation, and capstan motor M1 is stopped, thus interrupting rotation of capstan 2.

In the process of the counterclockwise movement of pinch roller holder 6 towards the retracted position, the pinch roller holder impinges on a round head portion 14a of first lock lever 14 which is being rotated clockwise under the action of spring 16 on the returning stroke of trigger plate 1, then passes beyond the round head portion, and eventually is locked by first lock lever 14.

In the embodiment so far described, the resilient-contact and disengagement of pinch roller 8 with and from capstan 2 are instantaneously achieved by the force of springs 20 and 19, andthe operation of the claw and the shutter is started and interrupted in association with the movement of the pinch roller. There is thus eliminated a risk of a film being fed by capstan 2 and pinch roller 8 when the claw and the shutter remain inoperative, with the freedom of the aforedescribed problems (a), (b) and (c). On the leftward stroke of trigger plate 1, spring 9 as well as springs 20 and 19 are loaded. In this connection, since spring 20 is constantly loaded by auxiliary lever 18 likewise the spring 13 of the prior art device shown in FIG. 2, and its spring force is compensated for by the trigger plate, then not so strong a force is required for this spring, in order to bring pinch roller 8 into resilient-contact with capstan 2. Spring 19 requires no stronger force than is necessary for returning pinch roller holder 6 and auxiliary lever 18 to the retracted position and home position, respectively. The force of this spring is much smaller than the force necessary for bringing pinch roller 8 into resilient-contact with capstan 2. Accordingly, the sum of the forces of springs 20 and 19 is smaller than the force of tumbler spring 5 of the device shown in FIG. 1. With this trigger device, therefore, considerably light trigger operation results, as compared with that of the prior art device as shown in FIG. 1.

Figure 6:
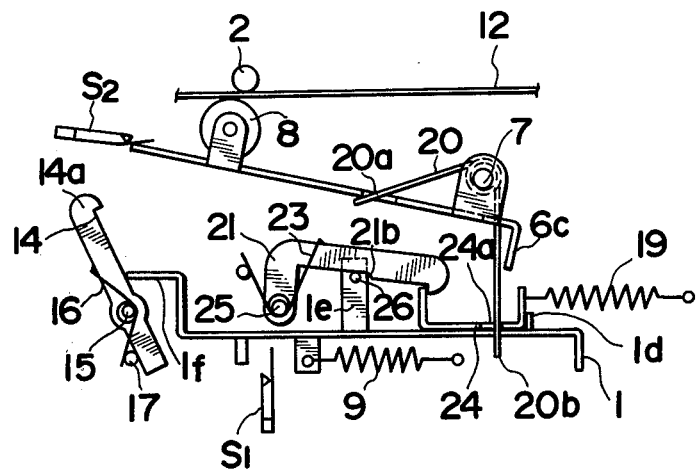
FIG. 6 is a side view of a trigger device of another embodiment of the present invention, which device is shown in a condition after completion of trigger actuation.

FIG. 6 shows a trigger device according to a second embodiment of the present invention, which is shown as the tirgger operation is terminated. In this embodiment, an auxiliary plate 24 mounted on trigger plate 1 serves as auxiliary lever 18 in the first embodiment, and second lock lever 21 in turn is supported by a shaft 25, which in turn is attached to the camera body, and is so loaded as to rotate clockwise under the action of spring 23. Auxiliary plate 24 slidingly reciprocates along trigger plate 1 under the guidance of a guide means (not shown), and is so loaded as to move rightwards under the action of spring 19. On the leftward stroke of trigger plate 1, auxiliary plate 24 is forced leftwards by an upright projection 1d of trigger plate 1, and arrested by second lock lever 21 immediately before trigger plate 1 urges first lock lever 14 by its leftmost end 1f. Second lock lever 21 is formed with a slant portion 21b in the mid portion of the lower longitudinal edge thereof, which slant portion is adapted to engage a pin 26 attached to an upright large projection 1e of trigger plate 1, so that when pin 26 engages the slant portion on the leftward stroke of trigger plate 1, the second lock lever 21 is rotated clockwise under the action of spring 23, and when pin 26 is located on the left side of slant portion 21b in engagement therewith, then second lock lever 21 arrests auxiliary plate 24 by its pawl portion in the manner shown in FIG. 6. A spring 20 for biasing pinch roller holder 6 to the resilient contact position has one end 20b retained in engagement by one edge of a cut-away portion 24a in auxiliary plate 24. The other prong of spring 20 is adapted to engage a bent portion 6c of pinch roller holder 6 when auxiliary plate 24 is returned to its home position under the action of spring 19, thereby bringing auxiliary plate 24 and pinch roller holder 6 into operative connection.

Figure 5:
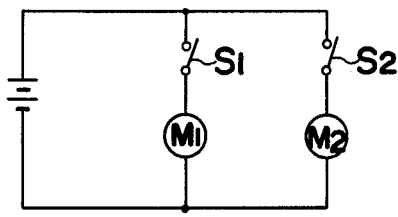
FIG. 5 is a circuit diagram of the trigger device shown in FIGS. 3 and 4.

When trigger plate 1 is shifted leftwards by the trigger operation, capstan 2 starts rotating, and the sound recording circuit becomes operative, as in the first embodiment. Auxiliary plate 24 is shifted by means of upright projection 1d of trigger plate 1, with the right side wall edge of cut-away portion 24a in the lever 24 pressing the lower end portion 20b of the other prong of spring 20, whereby spring 20 is loaded. When trigger plate 1 has been shifted to the left extremity, then first lock lever 14 is urged by the left end portion 1f of trigger plate 1 to rotate counterclockwise, thereby releasing pinch roller holder 6 from the locked position, whereby pinch roller holder 6 is abruptly rotated clockwise towards the resilient contact position by the force of spring 20 thus loaded, thereby bringing pinch roller 8 into resilient-contact with capstan 2 instantaneously. Thus, the continuous feeding of a film 12 as well as the recording of sound signals to the film are allowed. The clockwise movement of pinch roller holder 6 causes the claw and the shutter to operate, thereby allowing the intermittent feeding of film 12 and the exposure of the film. Immediately before pinch roller holder 6 is rotated clockwise, pin 26 on upright large projection 1e of trigger plate 1 passes beyond the slant portion 21b of second lock lever 21, as a result of which second lock lever 21 is rotated clockwise under the action of spring 23 to the position shown in FIG. 5, thereby locking auxiliary plate 24 at the terminal of leftward stroke caused by trigger plate 1.

When the trigger operation is interrupted, trigger plate 1 is shifted rightwards under the action of spring 9, and pin 26 rigid with projection 1e passes beyond slant portion 21b of second lock lever 21 to position on the left side thereof, thereby allowing this lever to rotate counterclockwise against the force of spring 23, whereby auxiliary plate 24 is released from second lock lever 21, and thereby shifted rightwards under the action of spring 19. Spring 20 at this time resumes its original position by its own force, to bring its prong into engagement with bent portion 6c of pinch roller holder 6. Then, the lower end portion 20b of spring 20 engages the left side wall edge of cut-away portion 24a of auxiliary plate 24, and thereby auxiliary plate 24 and pinch roller holder 6 are interconnected under the action of spring 20. Thus, pinch roller holder 6 will be abruptly rotated counterclockwise towards the retracted position under the influence of the rightward stroke of auxiliary plate 6. Consequently, pinch roller 8 instantaneously disengages from capstan 2, thereby interrupting the continuous feeding of film 12 as well as the recording of sound signals to the film, and at the same time, stopping the operation of the claw and the shutter, whereas the intermittent feeding of the film as well as the exposure to the film are interrupted. Immediately before restoration of trigger plate 1 to its home position, capstan more M1 stops to interrupt rotation of capstan 2, and the sound recording circuit stops its operation concurrently.

Also in this embodiment, the resilient-contact and disengagement of pinch roller 8 with and from capstan 2 are instantaneously accomplished by the forces of springs 20 and 19, and the operation of the claw and the shutter is started and interrupted concurrently. Accordingly, there is no likelihood of film 12 being fed by capstan 2 and pinch roller 8 when the claw and the shutter remains inoperative. The sum of the forces of springs 20 and 19 is not so large as tumbler spring 5 of the prior art device shown in FIG. 1, thus allowing the light trigger operation as in the first embodiment.

The present invention should not be construed as being limited to the above described embodiments. In the embodiments so far described for the purpose of simplification, pinch roller holder 6 and auxiliary lever 19 or auxiliary plate 24 are operatively connected to each other by spring 20 for biasing pinch roller holder 6, but these members may be connected by any suitable means separately provided. Instead of the running of the claw and shutter drive motor being governed by the pivotal movement of pinch roller holder 6 between the resilient contact position and the retracted position, the running of this drive motor may be started or interrupted by turning a switch on and off according to the position of trigger plate 1 on its advancing or returning stroke, more specifically, when the advancing stroke of trigger plate 1 reaches to the extremity at which first lever 14 releases pinch roller holder 6 from the locked condition, or when second lock lever 21 releases auxiliary lever 19 or auxiliary plate 24 from the locked condition on the returning stroke of trigger plate 1.

Respective trigger device for a sound motion picture camera according to the above embodiments is so arranged that, when the advancing stroke of trigger member reaches its extremity, the pinch roller holder is abruptly rotated to the resilient contact position under the action of the first spring loaded by the auxiliary member operating in association with the advancing stroke of the trigger member, and operation of the claw and the shutter is started at the same time; and on the returning stroke of the trigger member, the auxiliary member is immediately released from the locked condition and abruptly returned to its home position under the action of the second spring, to thereby be operatively connected with the pinch roller holder, whereby the pinch roller holder is abruptly returned to the retracted position, and operation of the claw and the shutter is stopped concurrently. With this arrangement, the intermittent feeding of a film by the claw, an exposure of a film and the continuous feeding of a film by capstan and pinch roller are started and interrupted without any time lag therebetween, with the freedom of the aforedescribed problems (a), (b) and (c). The first and second springs are loaded by the trigger operation. In this connection, since the first spring may be maintained as it is loaded by the auxiliary member even after the advancing stroke of the trigger member has reached its extremity, this first spring need not be given a strong force, unlike the tumbler spring 5 of the prior art device as shown in FIG. 2. The second spring requires no stronger force than is necessary for disengaging the pinch roller from the capstan. Despite the need of the first and second springs being loaded, there results a trigger operation which requires decreased operating force, as compared with that of the prior art device as shown in FIG. 2.

The first spring is as well used as a means for interconnecting the auxiliary member and the pinch roller holder, so as not to increase the number of parts incorporated, resulting in the simplicity of construction.

In the first embodiment, the second lock member is mounted on the trigger member so as to lock the auxiliary member at the terminal position of the leftward movement caused by the advancing stroke of the trigger member. This arrangement enables the second lock member to shift along with the trigger member when effecting the returning stroke, to ensure release of the auxiliary member from the locked condition, dispensing with any special means for transmitting the returning stroke of the trigger member to the lock lever, thus providing the simplicity in construction. The pinch roller holder and the auxiliary member are rotatably mounted on a common shaft, with a view to saving a space for placement and shift of these members, thus allowing reduction in size of the camera itself.

Should a switch be so arranged as to be turned on by the trigger member at the end of the advancing stroke thereof, so as to start the claw and shutter drive motor, there would arise a difficulty in adjusting the timing of causing the first lock member to release the pinch roller holder from the locked condition and the timing of closing the switch. However, both of the trigger devices of the above embodiments are so arranged that the switch is turned on by the pivotal movement of the pinch roller holder to the resilient-contact position so as to start the claw and shutter drive motor, thus being free from such problem.

What is claimed is:

1. In a sound motion picture camera which includes a capstan drive means and a claw and shutter drive means, a trigger device comprising:
   a reciprocatable trigger member;
   means for actuating said capstan drive means to rotate said capstan at an initial stage of advancing movement of said trigger member;
   a pinch roller holder pivotably supporting a pinch roller and being movable between an advanced position wherein said pinch roller is in resilient contact with said capstan and a retracted position wherein said pinch roller is separated from said capstan;
   first locking means for releasably locking said pinch roller holder at its retracted position, said first locking means being disposed in the path of the advancing movement of said trigger member so as to be disabled by said trigger member at a final stage of the advancing movement;
   first spring means coupled with said pinch roller holder and capable of urging said pinch roller holder towards said advanced position when loaded;
   a movable member coupled with said first spring means and capable of being coupled with said trigger member at least upon the advancing movement of said trigger member, said movable member being movable from an initial position to a terminal position for loading said first spring means in response to the advancing movement of said trigger member, and also capable of being coupled with said pinch roller holder at least upon movement thereof from said terminal position to said initial position;

second spring means for urging said movable member towards said initial position; and second locking means for releasably locking said movable member at said terminal position against the action of said second spring means, one of said movable member and said second locking means being supported on said trigger member such that said second locking means locks said movable member at the final stage of the advancing movement of said trigger member prior to the disablement of said first locking means, and said movable member being released from the locking by said second locking means upon returning movement of said trigger member, whereby said movable member is allowed to be moved to said initial position under the action of said second spring means, causing said pinch roller holder to move to said retracted position through the coupling with said movable member.

2. A trigger device as defined in claim 1, wherein said claw and shutter drive actuating means includes a switch which is disposed in the path of the movement of said pinch roller holder so as to be activated for actuating said claw and shutter drive means in response to the movement of said pinch roller holder from said retracted position to said advanced position.

3. A trigger device as defined in claim 1 wherein said second locking means is supported on said trigger member.

4. A trigger device as defined in claim 3, wherein said pinch roller holder and said movable member are coaxially supported for rotational movement respectively between said advanced and retracted positions and between said initial and terminal positions.

5. A trigger device as defined in claim 4, wherein said pinch roller holder is coupled with said movable member through said first spring means.

6. A trigger device as defined in claim 5, wherein said first spring means includes a wire spring having an end engaged with said pinch roller holder, an opposite end engaged with said movable member, a coiled portion wound coaxially with said pinch roller holder and said movable member, and an intermediate portion located between said coiled portion and said opposite end, said intermediate portion being engageable with said pinch roller holder to rotate the same from said advanced to said retracted position when said movable member is rotated from said terminal to said initial position under the action of said second spring means.

* * * * *